US012809590B2

(12) United States Patent
Perey

(10) Patent No.: US 12,809,590 B2
(45) Date of Patent: Nov. 24, 2026

(54) SEMI-AUTONOMOUS, AI-POWERED HIGH-ORDER OBJECTIVE DISSECTOR AND TRANSPARENT PROGRESSION SYSTEM

(71) Applicant: Dropbox, Inc., San Francisco, CA (US)

(72) Inventor: Patrick Perey, South San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 238 days.

(21) Appl. No.: 18/507,646

(22) Filed: Nov. 13, 2023

(65) Prior Publication Data

US 2025/0156154 A1 May 15, 2025

(51) Int. Cl.
*G06F 8/20* (2018.01)

(52) U.S. Cl.
CPC .................................... *G06F 8/20* (2013.01)

(58) Field of Classification Search
CPC ........................................................ G06F 8/20
See application file for complete search history.

(56) References Cited

U.S. PATENT DOCUMENTS

2013/0290970 A1 10/2013 Shah et al.
2014/0214469 A1 7/2014 Callow et al.
2017/0249574 A1 8/2017 Knijnik et al.
2019/0114549 A1 4/2019 Olsher
2019/0324795 A1 10/2019 Gao et al.
2022/0270021 A1 8/2022 Glocker
2022/0405687 A1 12/2022 Matsuoka et al.
2025/0053383 A1* 2/2025 Woodward, Jr. ...... G06F 9/4494
2025/0060949 A1* 2/2025 Savalle ............... G06F 11/3608
2025/0094137 A1* 3/2025 Du ........................... G06F 8/33
2025/0110706 A1* 4/2025 Votintseva ................ G06F 8/33
2025/0111148 A1* 4/2025 Namasivayam ........ G06F 40/20
2025/0117195 A1* 4/2025 Rieken ...................... G06F 8/33
(Continued)

OTHER PUBLICATIONS

Constantini D, "Welcome to Chainlit," Github, Retrieved on Dec. 11, 2023, 4 pages, Retrieved from the Internet: URL: https://github.com/Chainlit/chainlit.
(Continued)

*Primary Examiner* — Lewis A Bullock, Jr.
*Assistant Examiner* — Theodore E Hebert
(74) *Attorney, Agent, or Firm* — Keller Preece PLLC

(57) ABSTRACT

The present disclosure relates to systems, non-transitory computer-readable media, and methods for decomposing high-order objectives to implement automated or semi-automated changes to software applications. In particular, in one or more embodiments, the disclosed systems receive, from a client device, a high-order objective to be achieved within a computing system. In addition, in some embodiments, the disclosed systems determine, from the high-order objective, a set of sub-processes available to the computing system that combine to accomplish the high-order objective. Moreover, in some implementations, the disclosed systems generate, for a sub-process from among the set of sub-processes, a logic breakdown comprising a description of the sub-process and its predicted effect toward the high-order objective. Furthermore, in some embodiments, the disclosed systems provide the logic breakdown for display via the client device.

20 Claims, 14 Drawing Sheets

(56) References Cited

U.S. PATENT DOCUMENTS

| | | | | |
|---|---|---|---|---|
| 2025/0123894 | A1 * | 4/2025 | Kirk | G06F 9/5038 |
| 2025/0156681 | A1 * | 5/2025 | Palpant | G06N 20/00 |

OTHER PUBLICATIONS

Krenesky P., “iX-Autonomous GPT-4 Agent Platform,” Github, Retrieved on Dec. 11, 2023, 7 pages, Retrieved from the Internet: URL: https://github.com/kreneskyp/ix.

“Langchain,” Retrieved on Dec. 11, 2023, 6 pages, Retrieved from the Internet: URL: https://www.langchain.com/.

Nakajima Y., “Babyagi,” Github, Retrieved on Dec. 11, 2023, 4 pages, Retrieved from the Internet: URL: https://github.com/yoheinakajima/babyagi.

Reworkd, “Agent GPT,” Retrieved on Dec. 11, 2023, 1 page, Retrieved from the Internet: URL: https://agentgpt.reworkd.ai/.

Van Der Leer R, “AutoGPT: build & use AI agents,” Significant-Gravitas/AutoGPT, Github, Retrieved on Dec. 11, 2023, 3 pages, Retrieved from the Internet: URL: https://github.com/Significant-Gravitas/AutoGPT.

* cited by examiner

SEMI-AUTONOMOUS, AI-POWERED HIGH-ORDER OBJECTIVE DISSECTOR AND TRANSPARENT PROGRESSION SYSTEM

BACKGROUND

Advancements in computing platforms have given rise to a variety of innovations for software development tools. For example, existing software development kits provide a variety of libraries for constructing a computing application. Despite advances from these innovations, however, existing systems continue to suffer from a number of disadvantages.

For instance, existing software development systems that utilize artificial intelligence are often opaque. For example, existing systems may utilize artificial intelligence to produce some result for a software application, but without explanation of the methodology and/or rationale for reaching that result. Moreover, existing systems often utilize excessive time and computational resources to reach the result. For instance, existing systems often execute functions that are computationally intensive, without providing opportunities for a user to provide inputs or changes to the executed functions.

In addition, existing software development systems often inflexibly require many user interactions to achieve a production-ready software application. Moreover, existing systems often require many manual inputs to refine the software application.

These along with additional problems and issues exist with regard to existing software development systems.

BRIEF SUMMARY

Embodiments of the present disclosure provide benefits and/or solve one or more of the foregoing or other problems in the art with systems, non-transitory computer-readable media, and methods for utilizing artificial intelligence (AI) agents or heuristic methods to dissect high-order objectives into sub-processes and generate logic breakdowns in furtherance of the high-order objectives. In some embodiments, the disclosed systems receive a high-order objective and utilize an AI agent or a heuristic model to determine a set of sub-processes available to a computing system to accomplish the high-order objective. Additionally, in some implementations, the disclosed systems utilize one or more AI agents or one or more heuristic models to determine executable actions for the sub-processes. Moreover, the disclosed systems can generate a logic breakdown comprising a description of a sub-process and a predicted effect of the sub-process toward accomplishing the high-order objective. The disclosed systems can provide the logic breakdown for display via a client device. Furthermore, in some implementations, the disclosed systems receive inputs from the client device to edit and/or confirm the logic breakdown.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
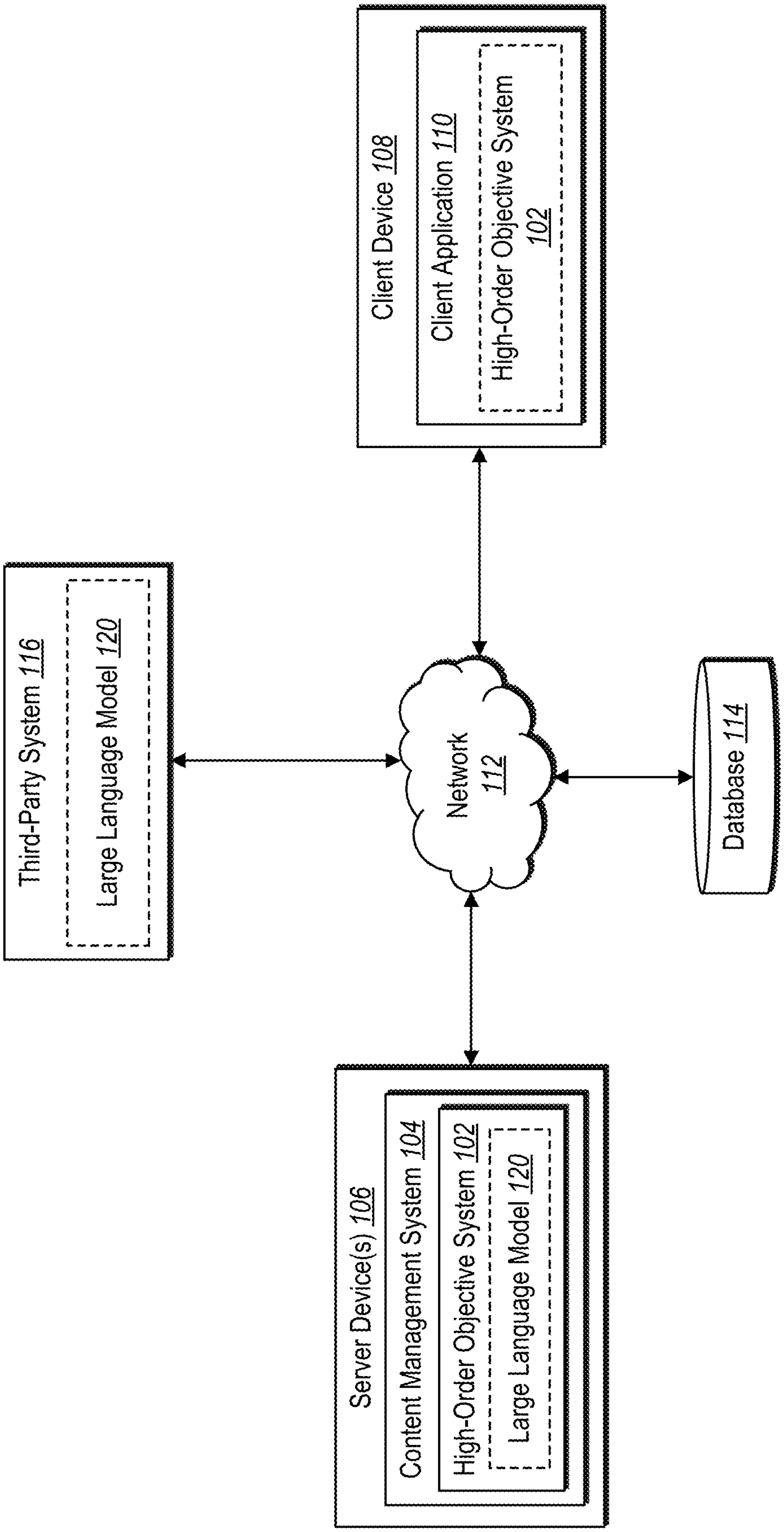
FIG. 1 illustrates a diagram of an environment in which a high-order objective system operates in accordance with one or more embodiments.

This disclosure describes one or more embodiments of a high-order objective system that decomposes high-order objectives to implement automated or semi-automated changes to software applications. To illustrate, in some implementations, the high-order objective system utilizes artificial intelligence (AI) agents to generate sub-processes for a high-order objective. Additionally, in some embodiments, the high-order objective system utilizes AI agents to determine executable actions for the sub-processes. The high-order objective system can generate logic breakdowns of the sub-processes and/or executable actions that illustrate their contributions toward the high-order objectives.

For example, the high-order objective system can receive a high-order objective and utilize an AI agent to determine a set of sub-processes available to a computing system to accomplish the high-order objective. Additionally, the high-order objective system can utilize one or more AI agents to determine the executable actions for the sub-processes. Moreover, the high-order objective system can generate the logic breakdown(s) comprising a description of a sub-process (or executable action) and a predicted effect of the sub-process (or executable action) toward accomplishing the high-order objective. The high-order objective system can provide the logic breakdown for display via a user interface of a client device. Furthermore, in some implementations, the high-order objective system can receive inputs from the client device to edit and/or confirm the logic breakdown.

As mentioned, the high-order objective system can provide end-to-end changes to software applications based on a high-order objective. To illustrate, the high-order objective system can break down a high-order objective into sub-processes and executable actions, execute the executable actions, provide options for editing and/or confirming the executable actions, and monitor progress of the sub-processes towards achieving the high-order objective.

The high-order objective system provides a variety of technical advantages relative to existing software development systems. For example, by providing a transparent window into the thought processes of one or more AI agents, the high-order objective system offers novel capabilities for software development unavailable through existing systems. Specifically, by providing a logic breakdown for display during run time of the AI agent(s), the high-order objective system provides insight that a user can user to modify the direction of the AI agent(s) as they execute actions in furtherance of a high-order objective. Moreover, the high-order objective system provides opportunities—throughout run time—for the user to pause and change processes to improve execution of actions in furtherance of a high-order objective. Thus, the high-order objective system can save time and computational resources (e.g., memory, communication bandwidth, processing steps, and/or required storage space) by addressing weaknesses in a function early on (e.g., instead of needlessly proceeding though the function to produce results that will be discarded).

In addition, the high-order objective system provides automation capabilities that have previously been unachievable with existing systems. In particular, by utilizing one or more AI agents to dissect a high-order objective into sub-processes and executable actions, the high-order objective system can enhance the quality of computing applications. For example, the high-order objective system can utilize the AI agent(s) to improve feature discovery, reduce user interactions within a user interface, speed up computing processes and functions, and enhance user experiences and user interfaces within the computing applications. Moreover, the high-order objective system can enhance other computing systems, such as an AI-powered assistant, an organizational operating system, a customer relationship management system, etc.

As illustrated by the foregoing discussion, the present disclosure utilizes a variety of terms to describe features and advantages of the high-order objective system. Additional detail is now provided regarding the meaning of such terms. For example, as used herein, the term "high-order objective" refers to a goal or desired outcome for a computing application or software application. In particular, the term "high-order objective" can include an input that sets a target for the high-order objective system to accomplish. To illustrate, a high-order objective can include a text input for an AI agent to improve a metric within a computing application (e.g., to improve processing speed, user interface and/or user experience, required user interactions, or feature discovery). Additionally, as used herein, the term "computing application" includes a software application, an application programming interface, or computer code.

Relatedly, as used herein, the term "target metric" refers to a desired feature for a computing application. For example, a target metric can include a desired processing speed, a desired metric for the user experience, or a desired metric for feature discovery (e.g., increasing a number of users utilizing a particular feature within the computing application).

As used herein the term "artificial intelligence agent" or "AI agent" refers to a machine learning model or a heuristic model that processes an input prompt to generate an output result. In some cases, an AI agent determines data sources and/or computational resources to perform a sub-process and/or execute an executable action. The AI agent can produce the result in the form of a metric, a description of a process, a section of executable code, or some other numeric and/or linguistic output.

Relatedly, as used herein, the term "machine learning model" refers to a computer representation that is tunable (e.g., trained) based on inputs to approximate unknown functions used for generating corresponding outputs. In particular, a machine learning model can include a computer-implemented model that utilizes algorithms to learn from, and make predictions on, known data by analyzing the known data to learn to generate outputs that reflect patterns and attributes of the known data. For instance, a machine learning model can include, but is not limited to, a neural network (e.g., a convolutional neural network, recurrent neural network, or other deep learning network), a decision tree (e.g., a gradient boosted decision tree), support vector learning, Bayesian networks, a transformer-based model, a diffusion model, or a combination thereof. In some embodiments, the high-order objective system utilizes a machine learning model in the form of a large language neural network.

Similarly, as used herein, the term "neural network" refers to a set of one or more machine learning models that can be trained and/or tuned based on inputs to determine classifications and/or scores, or to approximate unknown functions. For example, a neural network can include a model of interconnected artificial neurons (e.g., organized in layers) that communicate and learn to approximate complex functions and generate outputs based on inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a diffusion neural network, a recurrent neural network (e.g., an LSTM), a graph neural network, a transformer, or a generative adversarial neural network. Upon training, a neural network may become a large language model.

Relatedly, as used herein, the term "large language model" refers to a set of one or more machine learning models trained to perform computer tasks to generate or identify computing code and/or data in response to trigger events (e.g., user interactions, such as text queries and button selections). In particular, a large language model can be a neural network (e.g., a deep neural network) with many parameters trained on large quantities of data (e.g., unlabeled text) using a particular learning technique (e.g., self-supervised learning). For example, a large language model can include parameters trained to generate or identify computing code and/or data based on various contextual data, including information from historical user account behavior.

Additional detail regarding the high-order objective system will now be provided with reference to the figures. For example, FIG. 1 illustrates a schematic diagram of an example system environment for implementing a high-order objective system 102 in accordance with one or more implementations. An overview of the high-order objective system 102 is described in relation to FIG. 1. Thereafter, a more detailed description of the components and processes of the high-order objective system 102 is provided in relation to the subsequent figures.

As shown, the environment includes server device(s) 106, a client device 108, a database 114, a third-party system 116, and a network 112. Each of the components of the environment can communicate via the network 112, and the network 112 may be any suitable network over which computing devices can communicate. Example networks are discussed in more detail below in relation to FIGS. 13-14.

As mentioned above, the example environment includes client device 108. The client device 108 can be one of a variety of computing devices, including a smartphone, a tablet, a smart television, a desktop computer, a laptop computer, a virtual reality device, an augmented reality device, or another computing device as described in relation to FIGS. 13-14. The client device 108 can communicate with the server device(s) 106, the third-party system 116, and/or the database 114 via the network 112. For example, the client device 108 can receive user input from a user interacting with the client device 108 (e.g., via a client application 110) to, for instance, define a high-order objective, preview and/or edit a logic breakdown or a sub-process, and/or confirm one or more sub-processes to implement on a computing device. In addition, the high-order objective system 102 on the server device(s) 106 can receive information relating to the high-order objective and/or user interactions to preview, edit, and/or confirm logic breakdowns or sub-processes based on the input received by the client device 108.

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server device(s) 106. Based on instructions from the client application 110, the client device 108 can present or display information, including an interface for presenting logic breakdowns and/or summaries of sub-processes, from the high-order objective system 102 or from other network locations.

As illustrated in FIG. 1, the example environment also includes the server device(s) 106. The server device(s) 106 may generate, track, store, process, receive, and/or transmit electronic data, such as sub-processes for a high-order objective, executable actions for the sub-processes, logic breakdowns for the executable actions and/or the sub-processes, and/or user interactions to preview, edit, and/or confirm the logic breakdowns. For example, the server device(s) 106 may receive data from the client device 108 in the form of an input indicating the high-order objective and/or an edit to a sub-process or an executable action in support of the high-order objective. In addition, the server device(s) 106 can transmit data to the client device 108 in the form of a user interface for presenting logic breakdowns and/or summaries of sub-processes or executable actions. Indeed, the server device(s) 106 can communicate with the client device 108 to send and/or receive data via the network 112. In some implementations, the server device(s) 106 comprises a distributed server where the server device(s) 106 includes a number of server devices distributed across the network 112 and located in different physical locations. The server device(s) 106 can comprise one or more content servers, application servers, communication servers, web-hosting servers, machine learning servers, and/or other types of servers.

As shown in FIG. 1, the server device(s) 106 can also include the high-order objective system 102 as part of a content management system 104. The content management system 104 can communicate with the client device 108 to perform various functions associated with the client application 110 such as managing user accounts, managing software applications, managing content collections, managing content items, and facilitating user interaction with the software applications, content collections, and/or content items. Indeed, the content management system 104 can include a network-based smart cloud storage system to manage, store, and maintain content items and related data across numerous user accounts, including user accounts in collaboration with one another. In some embodiments, the high-order objective system 102 and/or the content management system 104 utilize the database 114 to store and access information such as digital content items.

As also illustrated in FIG. 1, the high-order objective system 102 can include one or more artificial intelligence agents, such as large language model 120. In particular, the high-order objective system 102 can utilize the large language model 120 that is integrated with (e.g., trained by data from) the content management system 104. For example, the high-order objective system 102 can store or encode relationship information to define relationships between user accounts and content items within the content management system 104 (and/or housed at other server locations). The high-order objective system 102 can, in response to an input indicating a high-order objective, utilize the large language model 120 (or one or more other AI agents) to determine sub-processes and/or generate logic breakdowns in furtherance of the high-order objective.

FIG. 1 further illustrates a third-party system 116. In particular, the third-party system 116 can host or house the large language model 120 (e.g., as an alternative to the server device(s) 106 hosting or housing the large language model 120) for access by the high-order objective system 102. For example, the third-party system 116 can include a server location hosting the large language model 120 that is external to the high-order objective system 102. In some cases, the third-party system 116 is external to the high-order objective system 102, but the high-order objective system 102 can nevertheless access and utilize the large language model 120 on the third-party system 116 to determine sub-processes and/or generate logic breakdowns in furtherance of a high-order objective.

Although FIG. 1 depicts the high-order objective system 102 located on the server device(s) 106, in some implementations, the high-order objective system 102 may be implemented by (e.g., located entirely, or in part, on) one or more other components of the environment. For example, the high-order objective system 102 may be implemented by the client device 108, and/or a third-party device. For example, the client device 108 can download all or part of the high-order objective system 102 for implementation independent of, or together with, the server device(s) 106.

In some implementations, the environment may have a different arrangement of components and/or may have a different number or set of components altogether. For example, the client device 108 may communicate directly with the high-order objective system 102 on the server device(s) 106, bypassing the network 112. As another example, the environment can include the database 114 located external to the server device(s) 106 (e.g., in communication via the network 112) or located on the server device(s) 106, on the third-party system 116, and/or on the client device 108.

As discussed above, in some embodiments, the high-order objective system 102 generates one or more logic breakdowns for accomplishing a high-order objective. For instance, FIG. 2 illustrates an overview of the high-order objective system 102 determining sub-processes for a high-order objective and generating a logic breakdown in accordance with one or more embodiments.

Figure 2:
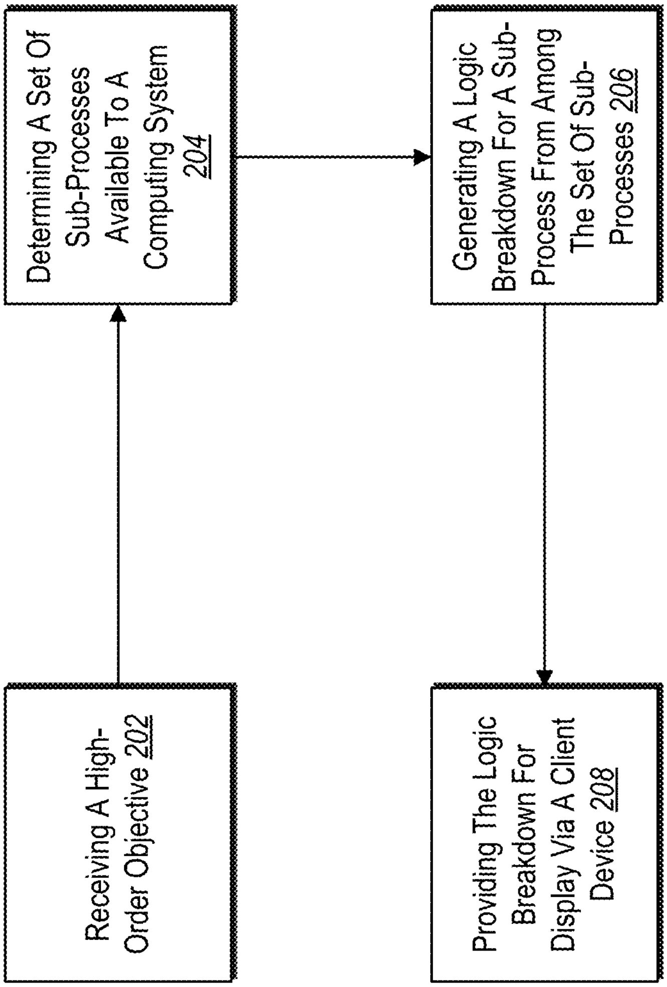
FIG. 2 illustrates an overview of the high-order objective system determining sub-processes for a high-order objective and generating a logic breakdown in accordance with one or more embodiments.

Specifically, FIG. 2 shows the high-order objective system 102 performing an act 202 of receiving a high-order objective for achieving a target metric within a computing system. For example, the high-order objective system 102 receives the high-order objective from a client device. To illustrate, the high-order objective system 102 obtains an input comprising a semantic meaning for achieving the target metric. In some cases, the high-order objective system 102 obtains the input as a text input. For instance, the high-order objective system 102 obtains the input typed into a user device or spoken verbally and transcribed into text. In some embodiments, the high-order objective system 102 obtains the input from a content item, such as a digital document or other electronic file. Moreover, in some cases, the high-order objective system 102 obtains the input from an application programming interface (e.g., an API requesting a logic breakdown for the high-order objective). To illustrate, the input indicates an objective or intent to accomplish the target metric utilizing computational resources within the computing system.

Additionally, FIG. 2 shows the high-order objective system 102 performing an act 204 of determining a set of sub-processes available to the computing system. For example, the high-order objective system 102 determines, from the high-order objective, a set of sub-processes available within the computing system or accessible by the computing system that combine to accomplish the high-order objective (e.g., the sub-processes are combinable to accomplish the high-order objective). As described in additional detail below, in some implementations, the high-order objective system 102 identifies computing resources within the computing system for performing executable actions in furtherance of the high-order objective.

Moreover, FIG. 2 shows the high-order objective system 102 performing an act 206 of generating a logic breakdown for a sub-process from among the set of sub-processes. For example, the high-order objective system 102 generates a logic breakdown comprising a description of the sub-process and its predicted effect toward the high-order objective (e.g., a predicted effect of the sub-process toward accomplishing the high-order objective). To illustrate, the high-order objective system 102 generates a textual description of the sub-process (e.g., for display via a user interface of the client device). Additional detail about generating and using the logic breakdown is given below.

Furthermore, FIG. 2 shows the high-order objective system 102 performing an act 208 of providing the logic breakdown for display via a client device. For example, the high-order objective system 102 provides, for display via a user interface of the client device, the logic breakdown comprising a textual description of the sub-process and a predicted effect of the sub-process toward accomplishing the high-order objective.

In some implementations, the high-order objective system 102 performs user base selection. For example, the high-order objective system 102 determines user groups based on logic patterns to aggregate users based on user characteristics, attributes, or metrics. The high-order objective system 102 can utilize the user groups to tailor software application features and/or experiences to certain user groups. Thus, the high-order objective system 102 can customize the software application based on a targeted audience of users.

As discussed above, in some embodiments, the high-order objective system 102 determines a set of sub-processes available to a computing system that are combinable to accomplish a high-order objective. For instance, FIG. 3 illustrates the high-order objective system 102 determining a set of sub-processes and one or more executable actions for the sub-processes in accordance with one or more embodiments.

Figure 3:
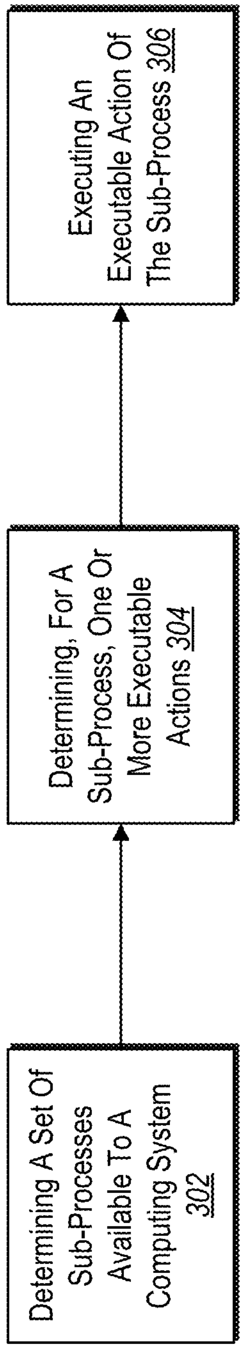
FIG. 3 illustrates the high-order objective system determining a set of sub-processes and one or more executable actions for the sub-processes in accordance with one or more embodiments.

Specifically, FIG. 3 shows the high-order objective system 102 performing an act 302 of determining a set of sub-processes available to a computing system. For example, the high-order objective system 102 identifies one or more computing applications for performing one or more executable actions in furtherance of the high-order objective. As another example, the high-order objective system 102 identifies application-specific computer code within a computing application for performing one or more executable actions in furtherance of the high-order objective. As yet another example, the high-order objective system 102 identifies an application programming interface for performing one or more executable actions. In some cases, the high-order objective system 102 identifies at least one of a computing application, computer code, or an application programming interface for performing one or more executable actions in furtherance of the high-order objective.

For example, in some implementations, the high-order objective system 102 determines the set of sub-processes utilizing one or more approaches described in GENERATING MULTI-ORDER TEXT QUERY RESULTS UTILIZING A CONTEXT ORCHESTRATION ENGINE, U.S. patent application Ser. No. 18/309,496, filed on Apr. 28, 2023, the contents of which are incorporated by reference herein in their entirety.

Furthermore, FIG. 3 shows the high-order objective system 102 performing an act 304 of determining, for a sub-process, one or more executable actions. For example, the high-order objective system 102 decomposes the sub-process into executable actions that work together to achieve the sub-process. In some cases, the high-order objective system 102 determines executable actions that are unique to the sub-process. In other cases, the high-order objective system 102 determines executable actions that can be shared across multiple sub-processes. As mentioned, in some embodiments, the high-order objective system 102 identifies a computing application (or application-specific code within a computing application) that is configured to execute the executable action. Additionally, in some implementations, the high-order objective system 102 identifies an application programming interface that is configured to execute or perform the executable action. Furthermore, the high-order objective system 102 can identify computer code that is configured to execute or perform the executable action.

In addition, in some embodiments, the high-order objective system 102 determines a data source corresponding to the sub-process. For example, in some implementations, the high-order objective system 102 determines an executable action for a sub-process by determining that certain data within the data source is needed to execute the executable action. The high-order objective system 102 can extract the needed data from the data source to generate one or more outputs (or intermediate results) for the executable action.

In addition, FIG. 3 shows the high-order objective system 102 performing an act 306 of executing an executable action of the sub-process. For example, the high-order objective system 102 can run the computing application (or the application-specific code within the computing application) to execute the executable action. Moreover, the high-order objective system 102 can run the application programming interface to perform the executable action.

In some implementations, the high-order objective system 102 extracts data from the data source to generate an output in furtherance of the high-order objective. In addition, the high-order objective system 102 can provide the output for display via a user interface of the client device.

As discussed above, in some embodiments, the high-order objective system 102 modifies and/or activates a sub-process within a computing system. For instance, FIG. 4 illustrates the high-order objective system 102 modifying and activating a sub-process in accordance with one or more embodiments.

Figure 4:
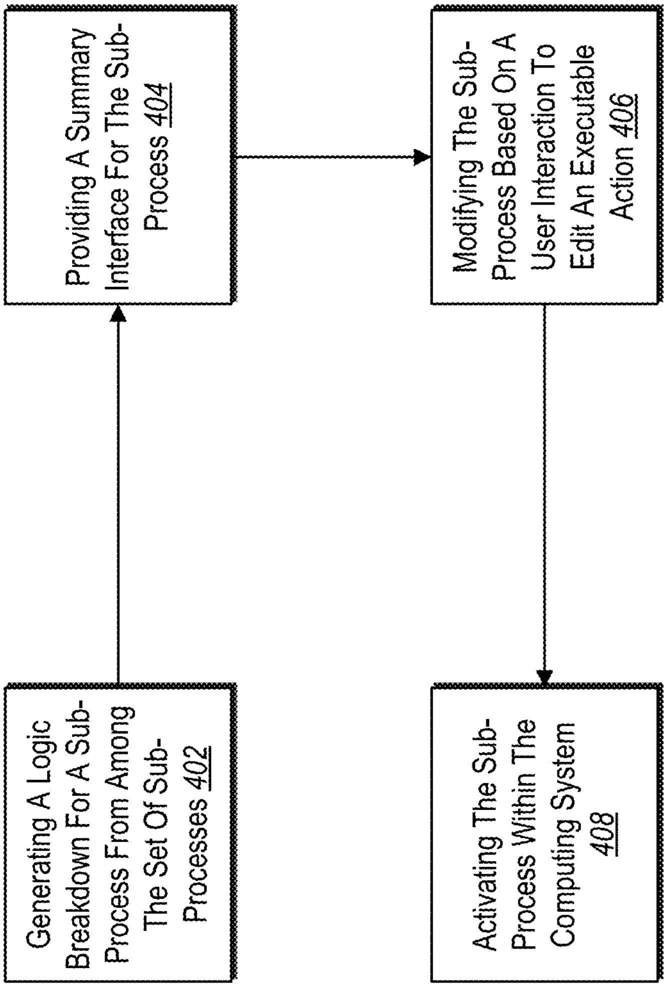
FIG. 4 illustrates the high-order objective system modifying and activating a sub-process in accordance with one or more embodiments.

Specifically, FIG. 4 shows the high-order objective system 102 performing an act 402 of generating a logic breakdown for a sub-process from among a set of sub-processes. For example, the high-order objective system 102 generates a description of the sub-process and a predicted effect of the sub-process toward achieving the high-order objective (e.g., similar to act 206 described above). To further illustrate, in some implementations, the high-order objective system 102 generates a plurality of logic sections comprising descriptions (e.g., textual descriptions) of the sub-process.

Moreover, in some embodiments, the high-order objective system 102 utilizes an AI agent (e.g., large language model 120) to generate the description of the sub-process from an input prompt indicating the high-order objective. In addition, in some embodiments, the high-order objective system 102 utilizes the AI agent to generate a predicted effect (e.g., as a text prediction) from the input prompt indicating the high-order objective. Moreover, in some implementations, the high-order objective system 102 utilizes the AI agent to generate a proposed action. For example, the high-order objective system 102 utilizes large language model 120 to generate one or more executable actions in furtherance of the high-order objective.

Additionally, FIG. 4 shows the high-order objective system 102 performing an act 404 of providing a summary interface for the sub-process. For instance, the high-order objective system 102 provides, via a graphical user interface on a client device, a textual summary of the sub-process. For example, the high-order objective system 102 provides explanations of one or more executable actions that contribute to the sub-process, as well as explanations and/or status updates of the execution of the executable actions.

Moreover, FIG. 4 shows the high-order objective system 102 performing an act 406 of modifying the sub-process based on a user interaction to edit an executable action. For example, the high-order objective system 102 receives (e.g., from the client device) an instruction to modify the sub-process. In some embodiments, the high-order objective system 102 generates a modification to the logic breakdown for the sub-process (e.g., in response to the instruction to modify the sub-process). Then, in some embodiments, the high-order objective system 102 provides the modification to the logic breakdown for display via a user interface of the client device. In some other embodiments, the high-order objective system 102 generates a new logic breakdown for the sub-process in response to the instruction to modify the sub-process. Then, in some embodiments, the high-order objective system 102 provides the new logic breakdown for display via the user interface of the client device.

To further illustrate, in some implementations, the high-order objective system 102 provides a control element for display via the client device. The high-order objective system 102 can receive a user interaction via the control element displayed on the client device. For example, the high-order objective system 102 receives a user interaction indicating an edit to the logic breakdown. Additionally, in some implementations, the high-order objective system 102 updates the logic breakdown (e.g., modifies the logic breakdown or generates an additional logic breakdown) for the sub-process based on the user interaction with the control element.

In some embodiments, the high-order objective system 102 updates parameters of an AI agent (e.g., the large language model 120). For example, the high-order objective system 102 updates parameters of large language model 120 based on the instruction to modify the sub-process. To illustrate, the high-order objective system 102 can tune parameters of the large language model 120 based on a comparison of outputs from the large language model 120 and instructions and/or modifications submitted via the user interaction. For example, the high-order objective system 102 can determine a measure of loss from the comparison and update the parameters of the large language model 120 to reduce the measure of loss.

In addition, in some implementations, the high-order objective system 102 modifies a data resource (e.g., additionally or alternatively to modifying a sub-process). For instance, the high-order objective system 102 can utilize an AI agent to generate a document (or other file) as a resource for one or more AI agents, and provide the document for display via the client device. Based on a user-provided input, the high-order objective system 102 can edit the document for future use by the one or more AI agents.

Furthermore, FIG. 4 shows the high-order objective system 102 performing an act 408 of activating the sub-process within the computing system. For instance, the high-order objective system 102 receives, from the client device, an instruction to activate the sub-process. In response, the high-order objective system 102 activates the sub-process within the computing system. For example, the high-order objective system 102 publishes the sub-process (e.g., as modified via user interaction(s)) to a new version of a computing application associated with the high-order objective.

As mentioned, in some implementations, the high-order objective system 102 provides various user interfaces to facilitate the several techniques, methods, steps, acts, or features of the high-order objective system 102. FIGS. 5-11 illustrate examples of such user interfaces.

As discussed above, in some embodiments, the high-order objective system 102 receives a high-order objective for achieving a target metric within a computing system. For instance, FIG. 5 illustrates the high-order objective system 102 receiving a high-order objective in accordance with one or more embodiments.

Figure 5:
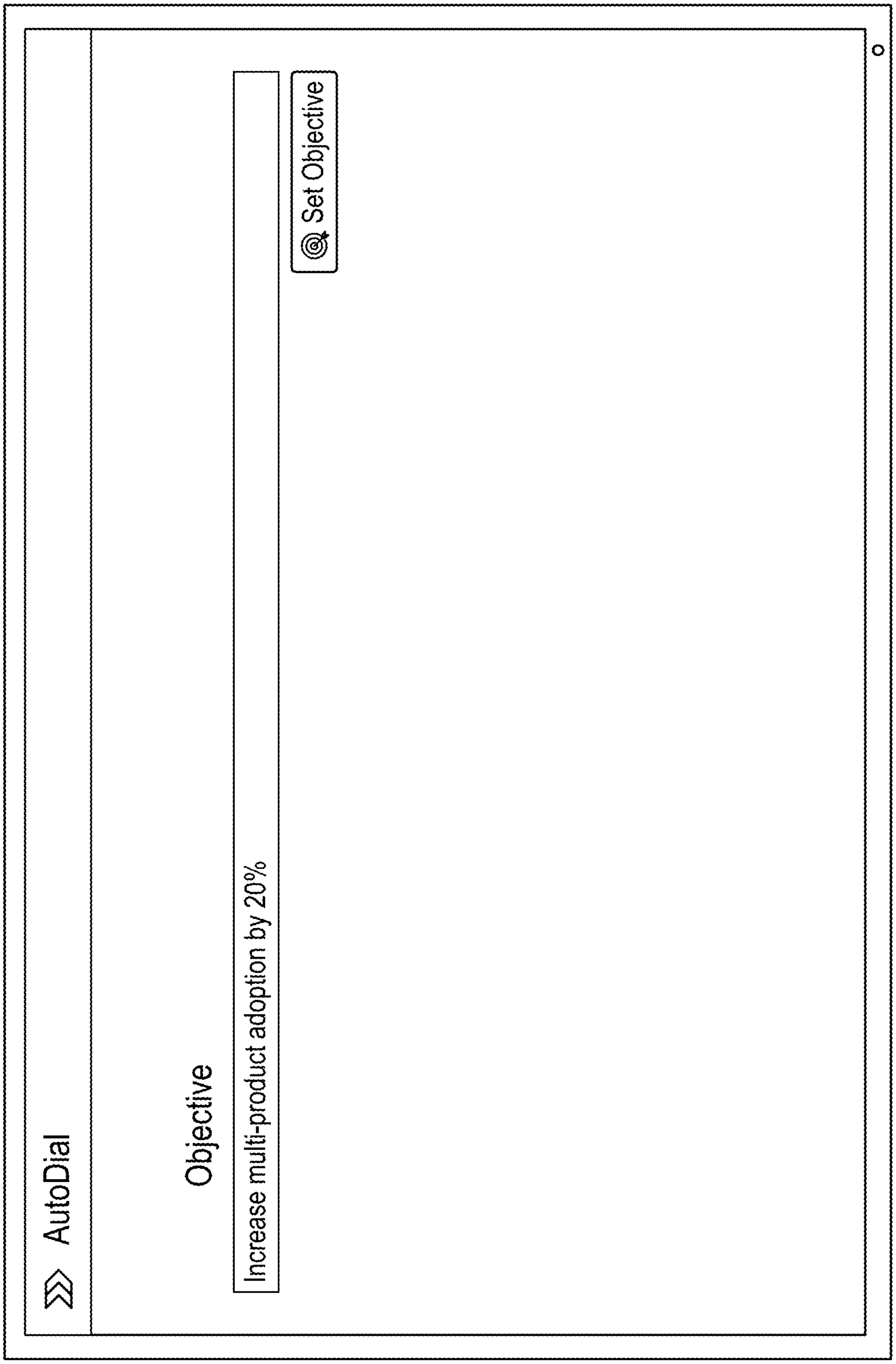
FIG. 5 illustrates the high-order objective system receiving a high-order objective in accordance with one or more embodiments.

Specifically, FIG. 5 shows the high-order objective system 102 providing a graphical user interface for display via a client device, whereby the high-order objective system 102 can receive the high-order objective. For example, the high-order objective system 102 provides a user interface to receive a text input indicating the high-order objective. In the example of FIG. 5, the high-order objective system 102 receives a text input to increase multi-product adoption by 20%. The high-order objective system 102 can provide a selection option for a user account to set the high-order objective (e.g., to send the high-order objective to the high-order objective system 102 and execute processes for achieving the high-order objective).

In some embodiments, the high-order objective system 102 provides (e.g., for display within the graphical user interface) example inputs for a high-order objective. For example, the high-order objective system 102 stores a history of high-order objectives that have been input (e.g., by the user account currently utilizing the high-order objective system 102, or by a plurality of user accounts, etc.) and processed to perform actions in support of the high-order objectives. The high-order objective system 102 can provide for display a sample set of high-order objectives as example inputs. In some cases, the high-order objective system 102 tailors the sample set based on the current user account (e.g., by providing example inputs that were input by user accounts related to the user account, such as user accounts close to the user account within an organizational ontology).

In some implementations, the high-order objective system 102 includes (e.g., for display with the example inputs) sub-processes that were associated with the example inputs. For instance, the high-order objective system 102 provides for display an example high-order objective input and one or more of the sub-processes that were generated from the example high-order objective input.

In some implementations, the high-order objective system 102 utilizes the input indicating the high-order objective by processing the input as a prompt through a large language model to generate the set of sub-processes. In alternative implementations, the high-order objective system 102 processes the input through heuristics (e.g., a heuristic model) to generate the set of sub-processes. To illustrate, the high-order objective system 102 aggregates historical data of past high-order objectives and their sub-processes and executable actions. Then, the high-order objective system 102 generates a model utilizing the historical data to process new high-order objectives and generate sub-processes and executable actions from the new high-order objectives.

As mentioned, in some embodiments, the high-order objective system 102 determines a set of sub-processes available to a computing system that are combinable to accomplish the high-order objective. For instance, FIG. 6 illustrates the high-order objective system 102 determining sub-processes for a high-order objective in accordance with one or more embodiments.

Figure 6:
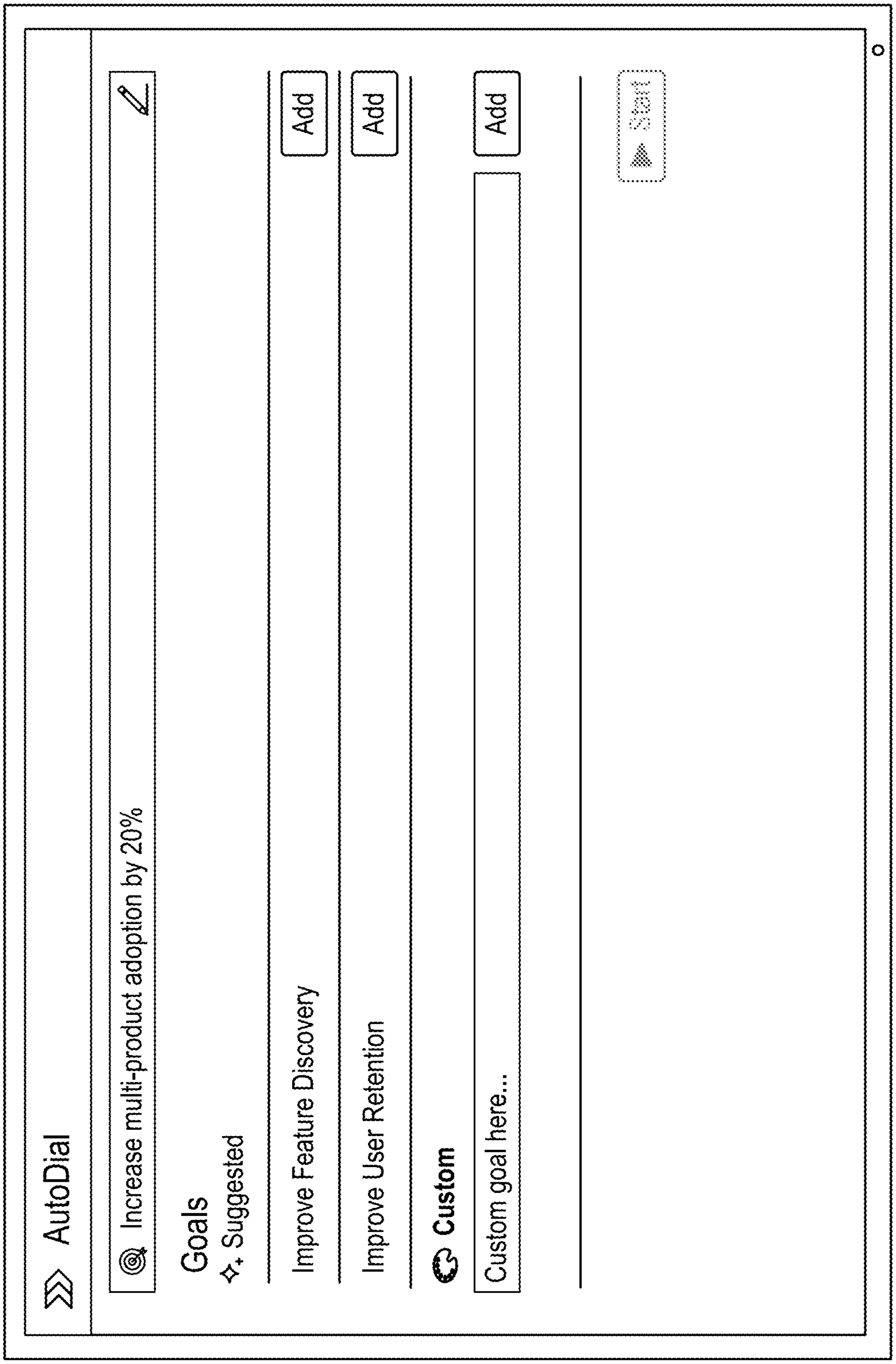
FIG. 6 illustrates the high-order objective system determining sub-processes for a high-order objective in accordance with one or more embodiments.

Specifically, FIG. 6 shows the high-order objective system 102 providing a graphical user interface for display via the client device. In particular, in the example of FIG. 6, the high-order objective system 102 processes the high-order objective "Increase multi-product adoption by 20%" through the large language model to break down the high-order objective into suggested sub-processes. For example, the high-order objective system 102 determines the sub-processes "Improve Feature Discovery" and "Improve User Retention." To illustrate, in some cases, a user seeks to increase adoption (e.g., by 20%) of a software application. The high-order objective system 102 can, for example, determine that by improving feature discovery and improving user retention, the high-order objective of increasing adoption would be achieved. Thus, the high-order objective system 102 provides these sub-processes for display in the graphical user interface.

In some implementations, the high-order objective system 102 utilizes one or more data sources to extract contextual data in support of determining the sub-processes. For example, the high-order objective system 102 can determine that certain contextual data is important to analyzing progress towards achieving the high-order objective. To illustrate, in support of the high-order objective "Increase multi-product adoption by 20%," the high-order objective system 102 can parse data from backend processes that demonstrate relationships between product adoption and other metrics. For example, the high-order objective system 102 can determine that increased feature discovery metrics and increased user retention metrics contribute directly toward increased multi-product adoption. Thus, the high-order objective system 102 can determine that the sub-processes "Improve Feature Discovery" and "Improve User Retention" would combine towards accomplishing the high-order objective "Increase multi-product adoption by 20%."

In some embodiments, the high-order objective system 102 provides a selection option to add a sub-process to the set of sub-processes. For example, the high-order objective system 102 provides an option to accept a suggested sub-process. As another example, the high-order objective system 102 provides an option for a user to provide a custom sub-process (e.g., via manual entry in the graphical user interface). For instance, a user inputs a user-defined sub-process as a text input to the high-order objective system 102. The high-order objective system 102 can treat the user-defined sub-process as if it were a system-generated sub-process. For example, the high-order objective system 102 can determine one or more executable actions for the user-defined sub-process, and otherwise incorporate the user-defined sub-process into the workflow for the high-order objective, as described below.

As discussed above, in some embodiments, the high-order objective system 102 determines one or more executable actions for a sub-process. For instance, FIG. 7 illustrates the high-order objective system 102 determining and executing executable actions in accordance with one or more embodiments.

Figure 7:
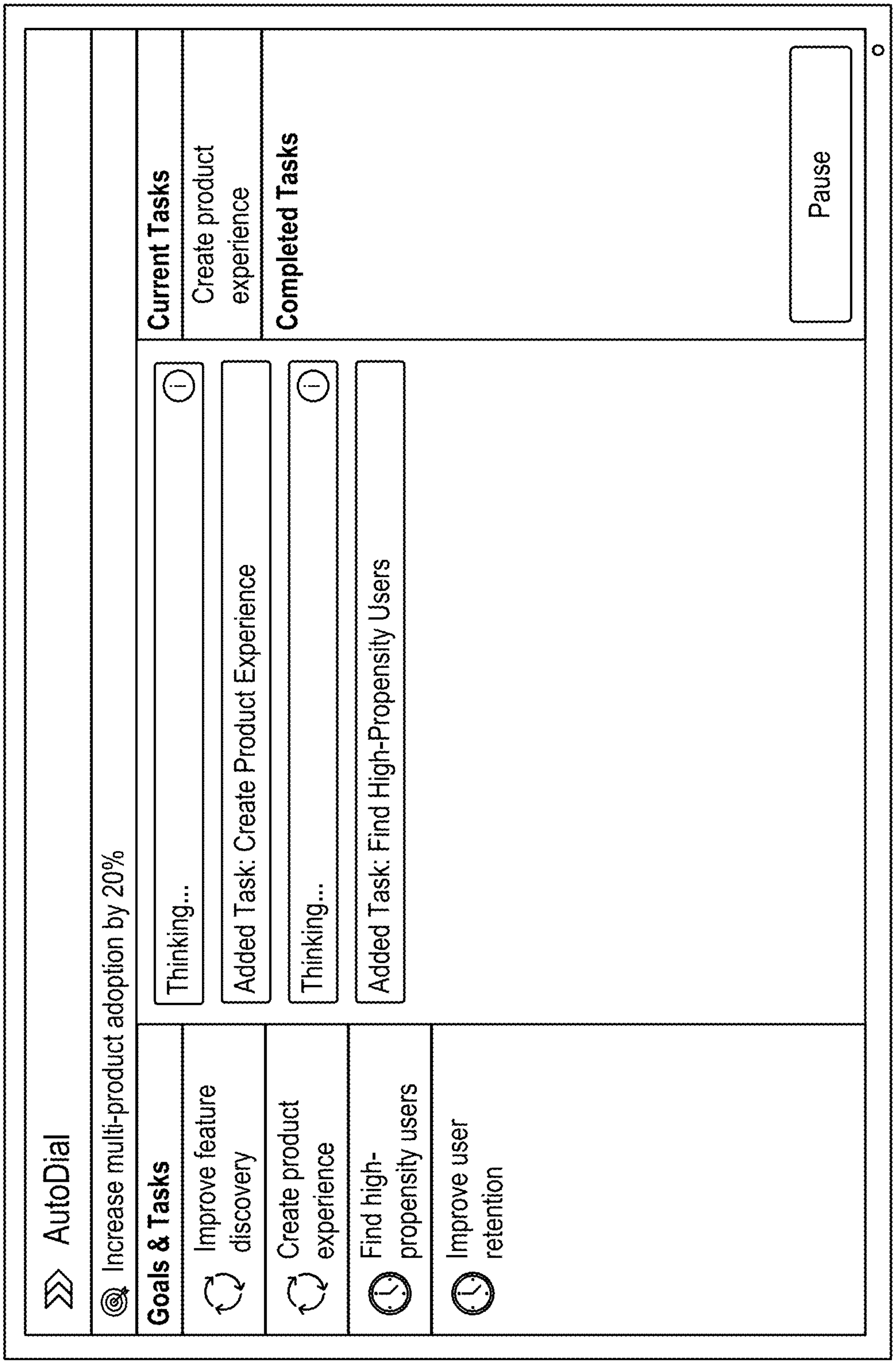
FIG. 7 illustrates the high-order objective system determining and executing executable actions in accordance with one or more embodiments.

Specifically, FIG. 7 shows the high-order objective system 102 providing a graphical user interface for display, including executable actions for a high-order objective. In particular, in the example of FIG. 7, the high-order objective system 102 processes the sub-process "Improve Feature Discovery" through an artificial intelligence (AI) agent (e.g., a large language model) to determine the executable actions "Create Product Experience" and "Find High-Propensity Users." For example, the high-order objective system 102 determines that creating a product experience and/or finding high-propensity users would contribute toward improving feature discovery within the software application.

In some embodiments, the high-order objective system 102 utilizes multiple AI agents (e.g., multiple large language models trained for different tasks) to determine the executable actions from the sub-processes. For instance, upon determining the sub-processes (e.g., utilizing a first AI agent), the high-order objective system 102 can then delegate to additional AI agents the responsibility of determining the executable actions. To illustrate, in some implementations, the high-order objective system 102 utilizes a first AI agent—trained to develop broad insights from multiple sources of contextual data—to determine the set of sub-processes. Then, the high-order objective system 102 utilizes one or more additional AI agents—trained to analyze data sources on a more specific level—to break down the sub-processes into the executable actions.

As an example, the high-order objective system 102 can utilizes a first AI agent to determine input metrics that contribute toward a particular output metric (e.g., multi-product adoption). The high-order objective system 102 determines that one or more executable actions contribute to or result in the input metrics. The high-order objective system 102 can then utilize a second AI agent to assess the input metrics to determine a computing application (or code within a computing application) that would contribute to improving the input metric. In this fashion, the high-order objective system 102 can utilize multiple AI agents in combination to achieve the high-order objective.

In some cases, the high-order objective system 102 utilizes an AI agent to spawn another AI agent. For instance, the high-order objective system 102 can determine that an additional AI agent is needed to parse data of a particular database to support an executable action. In this case, the high-order objective system 102 can utilize a preexisting AI agent to generate a new AI agent specialized to interface with the particular database.

In some implementations, the high-order objective system 102 ranks a plurality of potential executable actions (e.g., to suggest executable actions that are most likely to contribute to achieving the sub-process and/or the high-order objective) based on their associated input metrics and a likelihood that they will improve the output metric. For example, the high-order objective system 102 selects the executable actions "Create Product Experience" and "Find High-Propensity Users" as suggestions from a larger list of possible executable actions, based on determining that these two executable actions are most likely to contribute toward the sub-process of "Improve feature discovery."

As also shown in FIG. 7, the high-order objective system 102 can execute the executable actions. For instance, the high-order objective system 102 implements computing processes that run the executable actions, and updates the graphical user interface to reflect which executable actions are complete, in-progress, or to do. For example, FIG. 7 shows the high-order objective system 102 currently executing the executable action "Create product experience." In this way, the high-order objective system 102 can provide updates to inform a user of progress through the workflow.

In some embodiments, the high-order objective system 102 provides a selectable option to pause or stop the workflow. For example, a user may want to supervise the progress through the various executable actions (e.g., to provide feedback and/or edits for the AI agents). Thus, the high-order objective system 102 can provide user interface elements, such as the pause option, for a user to monitor and influence the progress of the AI agents.

Additionally, in some embodiments, the high-order objective system 102 provides a selectable option to view a logic breakdown for one or more of the executable actions. For example, and as described in further detail in connection with FIG. 8, the high-order objective system 102 provides for display the logic breakdown in response to a selection of an interface element to view rationale and/or other logic underlying the processes of an AI agent executing an executable action.

As mentioned, in some embodiments, the high-order objective system 102 generates and provides a logic breakdown associated with a sub-process or an executable action of a sub-process. For instance, FIG. 8 illustrates the high-order objective system 102 providing a logic breakdown for display via a graphical user interface in accordance with one or more embodiments.

Figure 8:
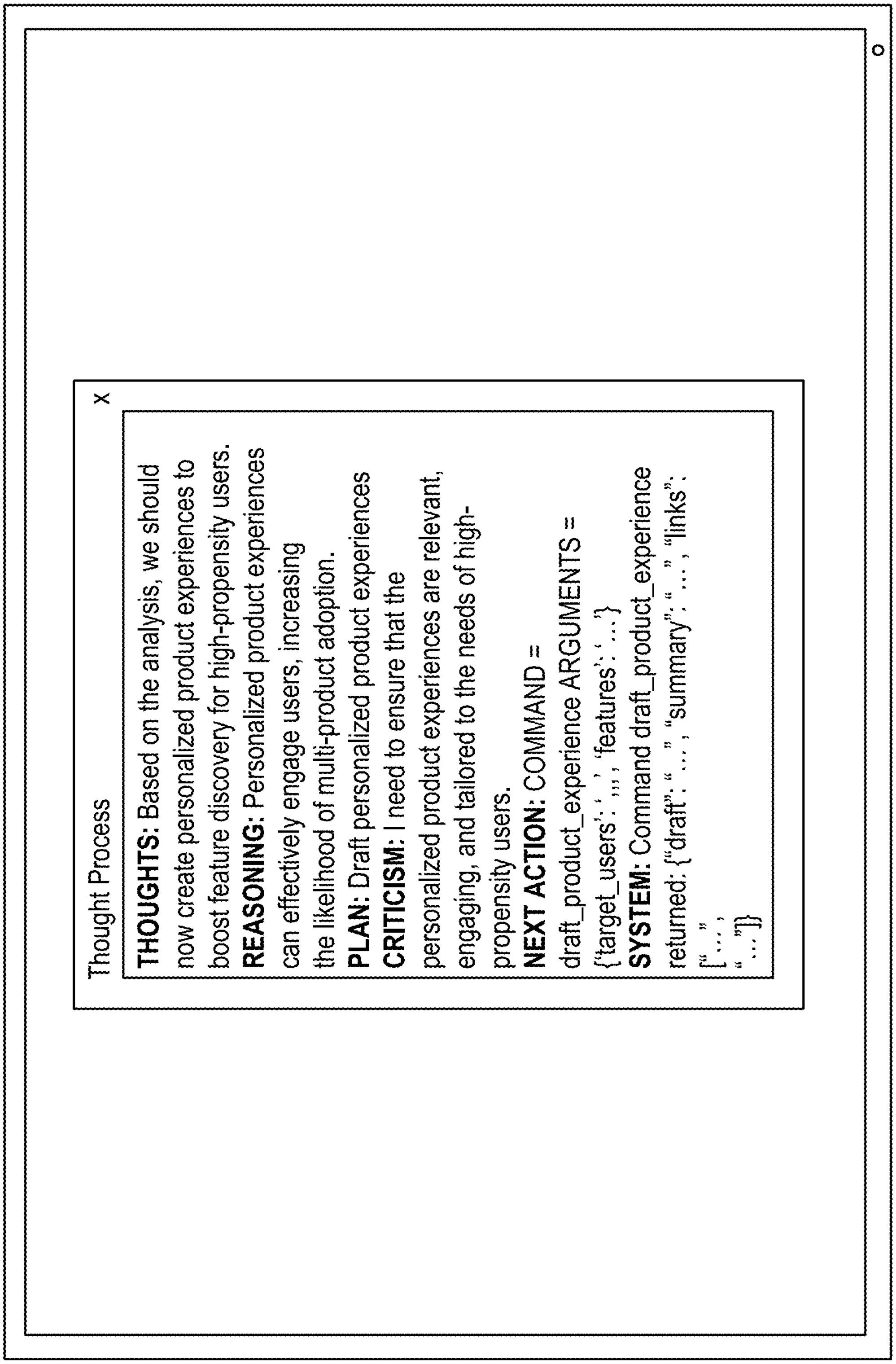
FIG. 8 illustrates the high-order objective system providing a logic breakdown for display via a graphical user interface in accordance with one or more embodiments.

Specifically, FIG. 8 shows the high-order objective system 102 providing a graphical user interface including a logic breakdown (e.g., a thought process of an AI agent) for an executable action. In particular, in the example of FIG. 8, the high-order objective system 102 generates and provides for display a logic breakdown for the executable action "Create Product Experience." In some implementations, the high-order objective system 102 includes (within the logic breakdown) thoughts of the AI agent. For example, the high-order objective system 102 generates a description of the executable action and/or the sub-process. Additionally, the high-order objective system 102 can generate a predicted effect of the executable action and/or the sub-process toward achieving the high-order objective.

To illustrate, the high-order objective system 102 generates a textual explanation of the rationale of the AI agent. As shown in the example of FIG. 8, the high-order objective system 102 can provide for display a thought process that includes explanation that, based on analysis by the AI agent, creating personalized product experiences would boost feature discovery for high-propensity users. Additionally, the high-order objective system 102 can include, within the logic breakdown, reasoning that personalized product experiences can effectively engage users, thereby increasing the likelihood of multi-product adoption. Moreover, the high-order objective system 102 can provide a plan to draft personalized product experiences.

In addition, in some implementations, the high-order objective system 102 provides criticism of the AI agent's rationale. For instance, the high-order objective system 102 can utilize the AI agent to self-reflect, thereby providing the AI agent to adapt based on new information. For example, as shown in FIG. 8, the high-order objective system 102 determines that the AI agent should ensure that the personalized product experiences are relevant, engaging, and tailored to the needs of high-propensity users. In some cases, the high-order objective system 102 updates parameters of the AI agent (e.g., updating parameters of a large language model) based on the self-reflection or self-criticism. By providing and acting on the self-criticism, the high-order objective system 102 can improve the sub-processes contributing to the high-order objective, and can improve the AI agents for use in future dissections of other high-order objectives.

Furthermore, in some embodiments, the high-order objective system 102 provides, within the logic breakdown, a description of a next action for the executable action. Moreover, the high-order objective system 102 can provide returned results from the next action.

In some implementations, the high-order objective system 102 provides a user interface element to solicit feedback during the thought process. For instance, the high-order objective system 102 can receive an instruction to update the logic breakdown (e.g., modify the logic breakdown or generate a new logic breakdown) during execution of the executable task. In some cases, the high-order objective system 102 can receive the instruction as a text input to process as a prompt through the AI agent. To illustrate further, in some implementations, the high-order objective system 102 processes the feedback received (e.g., the instruction to update the logic breakdown) through the AI agent, from which the AI agent reconsiders and/or regenerates the logic breakdown with the feedback in consideration.

Moreover, in some implementations, the high-order objective system 102 provides a user interface element to pause, stop, or bypass an executable action during the thought process (e.g., as a feedback mechanism to adjust or remove the executable action). By providing the logic breakdown and selectable options to pause, stop, bypass, and/or edit executable actions, the high-order objective system 102 provides insight into the inner workings of the AI agent(s), as well as the option for a user to stop or change actions at transparent mid-points of the process (e.g., rather than having to wait for an ultimate output to update or correct portions of the workflow).

As mentioned, in some embodiments, the high-order objective system 102 provides a summary interface for a sub-process and/or an executable action of a sub-process. For instance, FIG. 9 illustrates the high-order objective system 102 providing a summary of an executable action with selectable options to edit, preview, and/or confirm the executable action in accordance with one or more embodiments.

Figure 9:
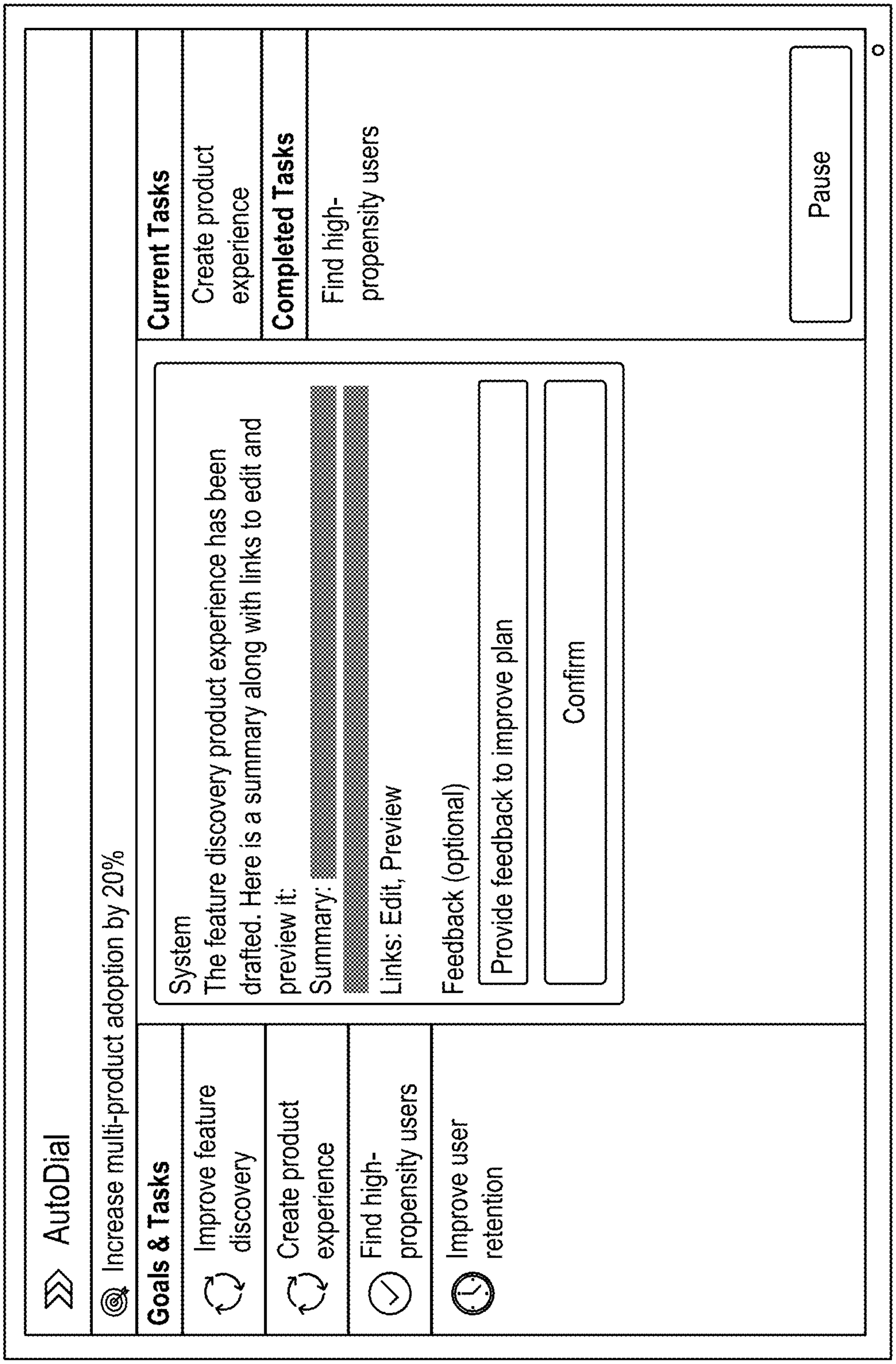
FIG. 9 illustrates the high-order objective system providing a summary of an executable action with selectable options to edit, preview, and/or confirm the executable action in accordance with one or more embodiments.

Specifically, FIG. 9 shows the high-order objective system 102 providing a graphical user interface for display, including executable actions for a high-order objective. In particular, in the example of FIG. 9, the high-order objective system 102 provides a summary of the executable action "Create product experience," including a note that a feature discovery product experience has been drafted. Additionally, the high-order objective system 102 can solicit feedback from a user to improve the executable action. Moreover, the high-order objective system 102 can provide additional detail about the executable action via a preview selection element. In addition, the high-order objective system 102 can provide an edit selection element whereby a user can manually modify the executable action.

In this way, the high-order objective system 102 provides a novel technique for interfacing AI agents with user interactions. In particular, the high-order objective system 102 provides options for a user to view the rationale of one or more AI agents during run time, and to supervise and guide the processes of the one or more AI agents.

As mentioned, in some implementations, the high-order objective system 102 provides a preview feature. For example, the high-order objective system 102 provides a selectable user interface element to preview experimental results of the sub-processes and/or the executable tasks. For instance, upon selection of the selectable user interface element to preview, the high-order objective system 102 executes the executable task(s) and provides results to the client device (e.g., before publishing changes to the executable tasks to an updated version of the software application). Thus, the high-order objective system 102 can generate and run experiments on the software application without affecting live users of the software application as it currently stands.

In some implementations, the high-order objective system 102 provides a selectable user interface element to confirm an executable action or a sub-process. To illustrate, upon selection of the selectable user interface element to confirm, the high-order objective system 102 can activate and/or publish the executable action or sub-process (e.g., including any modifications initiated by a user via the edit selection option) to a version of a software application. For instance, the high-order objective system 102 can automatically finalize the version of the software application for publication to end-users.

As discussed above, in some embodiments, the high-order objective system 102 provides edit options for a sub-process and/or an executable action. For instance, FIG. 10 illustrates the high-order objective system 102 providing a user interface to edit an executable action in accordance with one or more embodiments.

Figure 10:
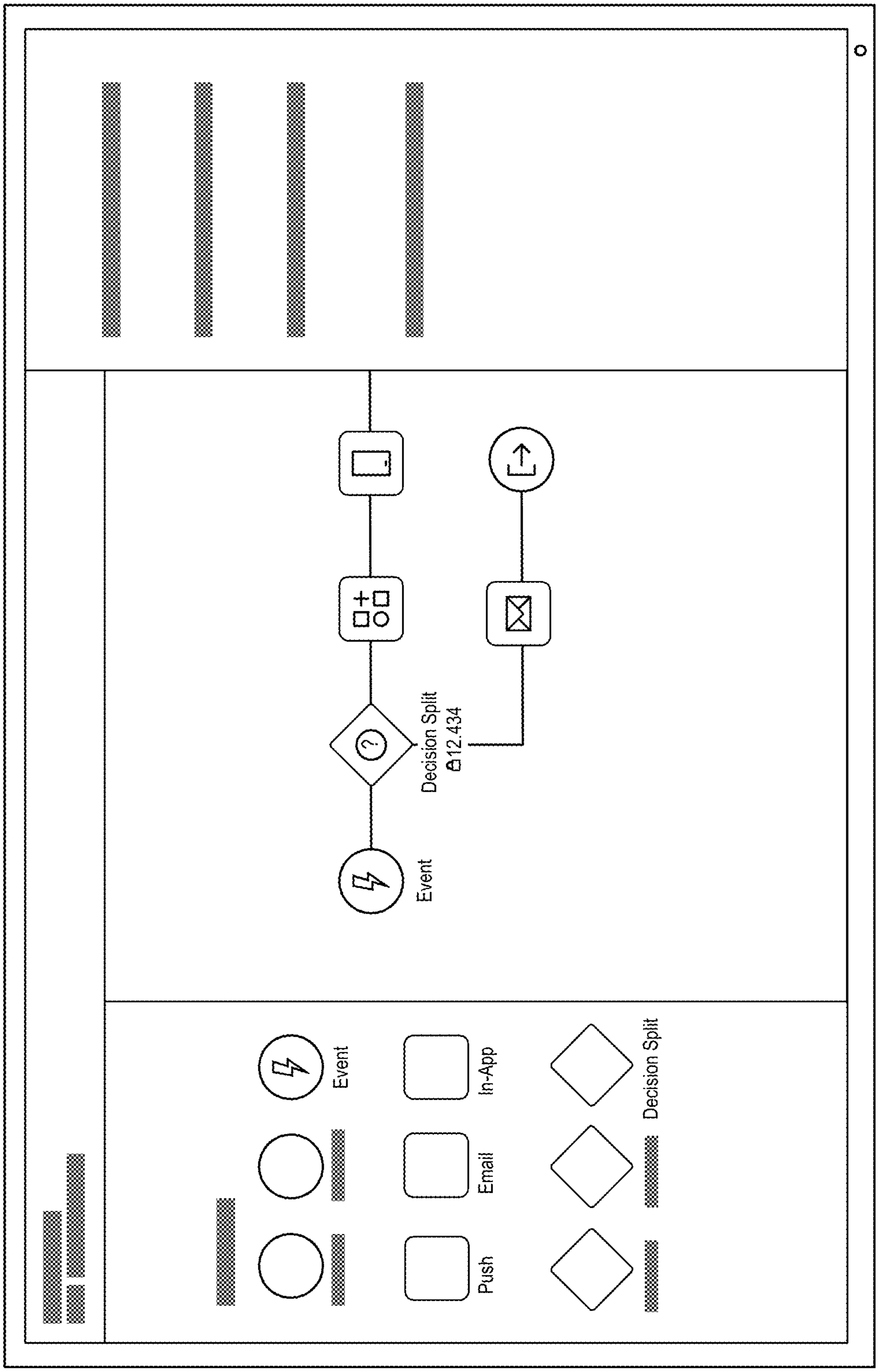
FIG. 10 illustrates the high-order objective system providing a user interface to edit an executable action in accordance with one or more embodiments.

Specifically, FIG. 10 shows the high-order objective system 102 providing an editing interface for integrating software applications and modifying software applications. In particular, the high-order objective system 102 can monitor data within a software application (e.g., placement of a user interface element within a graphical user interface) to determine and propose changes to enhance a user experience. In this way, the high-order objective system 102 can provide an end-to-end integrated process for automating software development.

Moreover, the high-order objective system 102 can utilize software development kits to build repositories of application-specific data to support decomposing the high-order objective into sub-processes and executable actions.

As discussed above, in some embodiments, the high-order objective system 102 provides a user interface to monitor progress of a sub-process. For instance, FIG. 11 illustrates the high-order objective system 102 providing, for display via a graphical user interface, a dashboard for a high-order objective in accordance with one or more embodiments.

Figure 11:
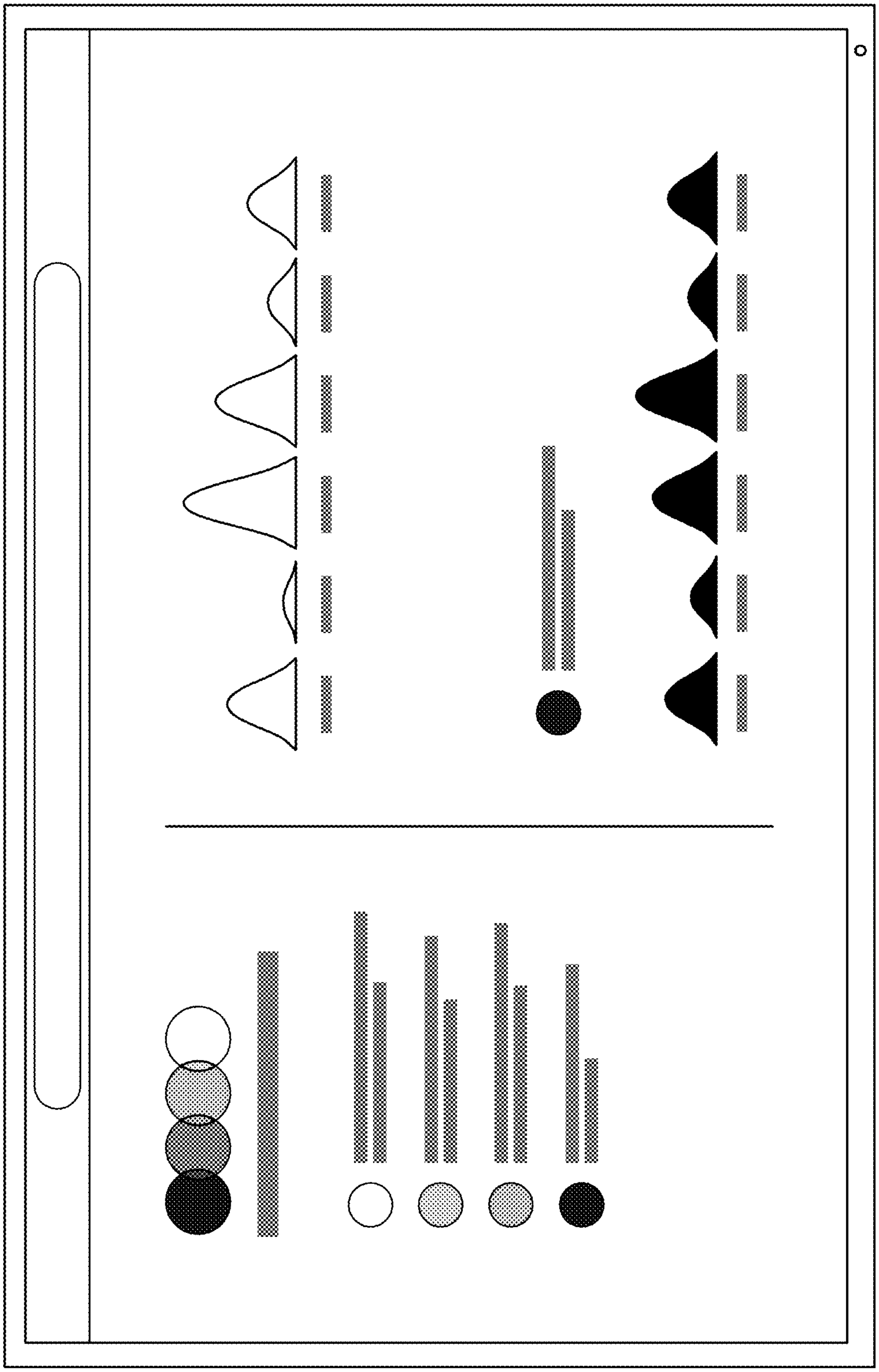
FIG. 11 illustrates the high-order objective system providing, for display via a graphical user interface, a dashboard for a high-order objective in accordance with one or more embodiments.

Specifically, FIG. 11 shows the high-order objective system 102 providing a graphical user interface including a dashboard for monitoring performance of the set of sub-processes for the high-order objective. To illustrate, in some embodiments, the high-order objective system 102 provides a graphical user interface that indicates a status of an executable action, a sub-process, and/or an overarching software application. For example, upon selection by a user of the confirm button shown in FIG. 9, the high-order objective system 102 can indicate, via the dashboard, that the software application is active and published for end-users. In addition, in some embodiments, the high-order objective system 102 provides historical data based on prior objectives and/or predictive metrics for a current high-order objective.

To further illustrate, the high-order objective system 102 can provide a software development kit for a user (e.g., a software developer) to track which features and/or user experiences are available in the published software application. For example, the high-order objective system 102 captures user interactions through event tracking and logging, stores the user interactions in a database, and provides the user interactions for display in the dashboard.

Figure 12:
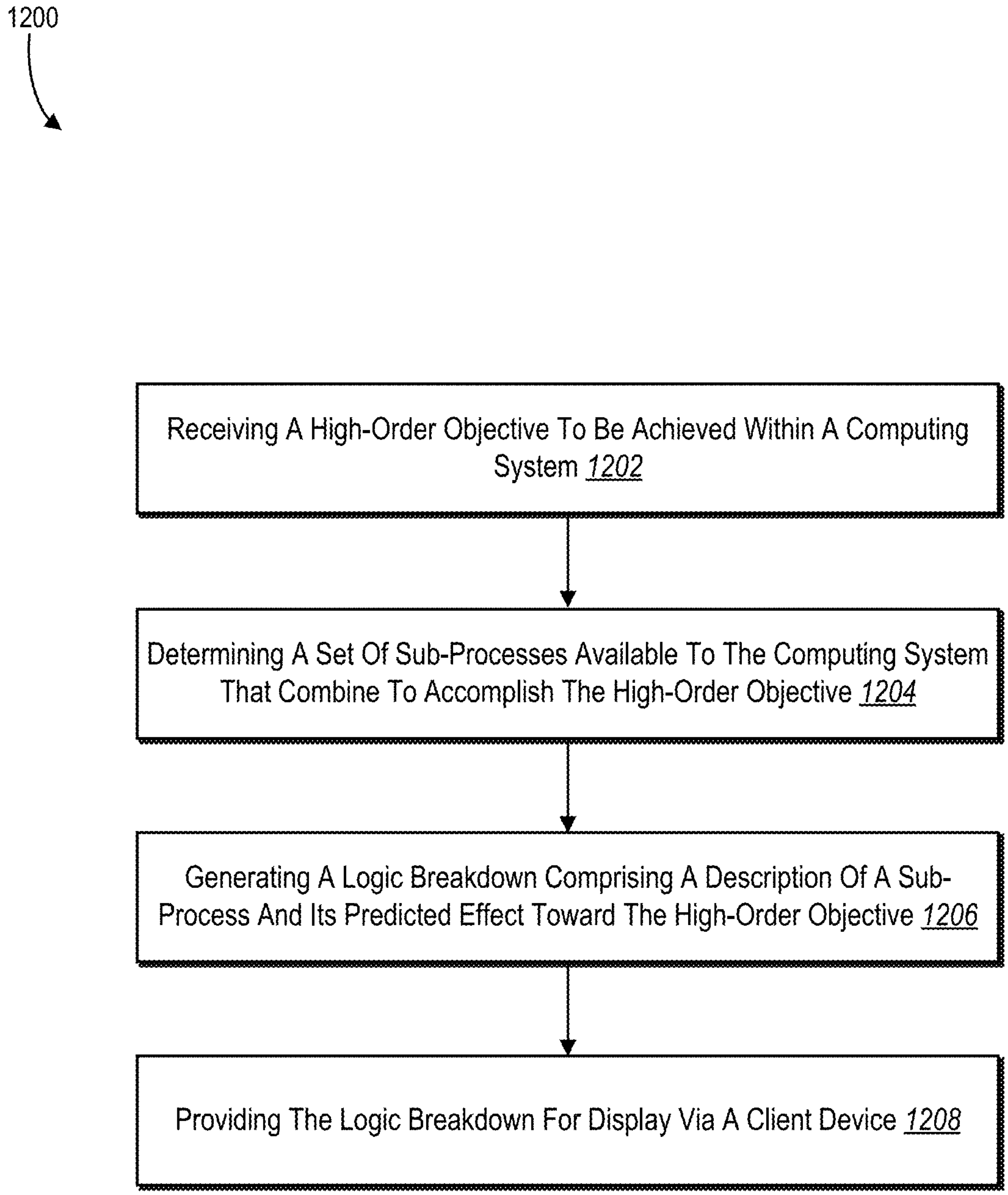
FIG. 12 illustrates a flowchart of a series of acts for determining sub-processes and generating a logic breakdown for a high-order objective in accordance with one or more embodiments.

FIGS. 1-11, the corresponding text, and the examples provide a number of different methods, systems, devices, and non-transitory computer-readable media of the high-order objective system 102. In addition to the foregoing, one or more embodiments can also be described in terms of flowcharts comprising acts for accomplishing a particular result, as shown in FIG. 12. FIG. 12 may be performed with more or fewer acts. Further, the acts may be performed in differing orders. Additionally, the acts described herein may be repeated or performed in parallel with one another or parallel with different instances of the same or similar acts.

As mentioned, FIG. 12 illustrates a flowchart of a series of acts 1200 for determining sub-processes and generating a logic breakdown for a high-order objective in accordance with one or more implementations. While FIG. 12 illustrates acts according to one implementation, alternative implementations may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause a computing device to perform the acts of FIG. 12. In some implementations, a system performs the acts of FIG. 12.

As shown in FIG. 12, the series of acts 1200 includes an act 1202 of receiving a high-order objective to be achieved within a computing system, an act 1204 of determining a set of sub-processes available to the computing system that combine to accomplish the high-order objective, an act 1206 of generating a logic breakdown comprising a description of a sub-process and its predicted effect toward the high-order objective, and an act 1208 of providing the logic breakdown for display via a client device.

In particular, in some implementations, the act 1202 includes receiving, from a client device, a high-order objective to be achieved within a computing system, the act 1204 includes determining, from the high-order objective, a set of sub-processes available to the computing system that combine to accomplish the high-order objective, the act 1206 includes generating, for a sub-process from among the set of sub-processes, a logic breakdown comprising a description of the sub-process and its predicted effect toward the high-order objective, and the act 1208 includes providing the logic breakdown for display via the client device.

Moreover, in some implementations, the act 1202 includes receiving, from a client device, a high-order objective for achieving a target metric within a computing system. In addition, in some implementations, the act 1204 includes determining, from the high-order objective, a set of sub-processes available to the computing system that are combinable to accomplish the high-order objective, and the act 1206 includes generating, for a sub-process from among the set of sub-processes, a logic breakdown comprising a description of the sub-process and a predicted effect of the sub-process toward accomplishing the high-order objective. Additionally, in some implementations, the act 1202 includes receiving, from a client device, a high-order objective for achieving one or more target metrics within a computing system. Furthermore, in some implementations, the act 1206 includes generating, for a sub-process from among the set of sub-processes, a logic breakdown comprising a textual description of the sub-process and a predicted effect of the sub-process toward accomplishing the high-order objective, and the act 1208 includes providing, for display via a user interface of the client device, the logic breakdown comprising the textual description and the predicted effect.

For example, in some implementations, the series of acts 1200 includes receiving the high-order objective to be achieved within the computing system by obtaining an input comprising a semantic meaning for achieving the high-order objective. Furthermore, in some implementations, the series of acts 1200 includes receiving the high-order objective for achieving the target metric within the computing system by obtaining a text input comprising a semantic meaning for achieving the target metric.

In addition, in some implementations, the series of acts 1200 includes determining the set of sub-processes available to the computing system by identifying one or more computing applications for performing one or more executable actions in furtherance of the high-order objective. In some implementations, the series of acts 1200 includes determining the set of sub-processes available to the computing system by identifying application-specific computer code within a computing application for performing one or more executable actions in furtherance of the high-order objective. Additionally, in some implementations, the series of acts 1200 includes determining the set of sub-processes available to the computing system by identifying at least one of an application programming interface or computer code for performing one or more executable actions in furtherance of the high-order objective.

Moreover, in some implementations, the series of acts 1200 includes generating the logic breakdown by generating a plurality of logic sections comprising descriptions of the sub-process. In some implementations, the series of acts 1200 includes generating the logic breakdown by generating a plurality of logic sections comprising textual descriptions of the sub-process.

Furthermore, in some implementations, the series of acts 1200 includes generating the logic breakdown by utilizing a large language model to generate the description of the sub-process from a prompt related to the high-order objective. In some implementations, the series of acts 1200 includes utilizing a large language model to generate a proposed action.

Additionally, in some implementations, the series of acts 1200 includes receiving, via a control element displayed on the client device, a user interaction indicating an edit to the logic breakdown; and updating the logic breakdown for the sub-process based on the user interaction indicating the edit. In some implementations, the series of acts 1200 includes providing a control element for display via the client device; and generating an additional logic breakdown for the sub-process based on a user interaction with the control element.

Moreover, in some implementations, the series of acts 1200 includes providing the logic breakdown for display by providing a textual description of the sub-process for display via the client device. In some implementations, the series of acts 1200 includes receiving, from the client device, an instruction to modify the sub-process; and updating parameters of a large language model based on the instruction to modify the sub-process. Additionally, in some implementations, the series of acts 1200 includes receiving, from the client device, an instruction to modify the sub-process; generating, based on the instruction to modify the sub-process, a new logic breakdown for the sub-process; and providing, for display via the user interface, the new logic breakdown.

Furthermore, in some implementations, the series of acts 1200 includes determining a data source corresponding to the sub-process; and extracting data from the data source to generate an output in furtherance of the high-order objective. In some implementations, the series of acts 1200 includes determining a data source corresponding to the sub-process; extracting data from the data source to generate an output in furtherance of the high-order objective; and providing the output for display via the user interface.

In addition, in some implementations, the series of acts 1200 includes receiving, from the client device, an instruction to activate the sub-process; and activating the sub-process within the computing system.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
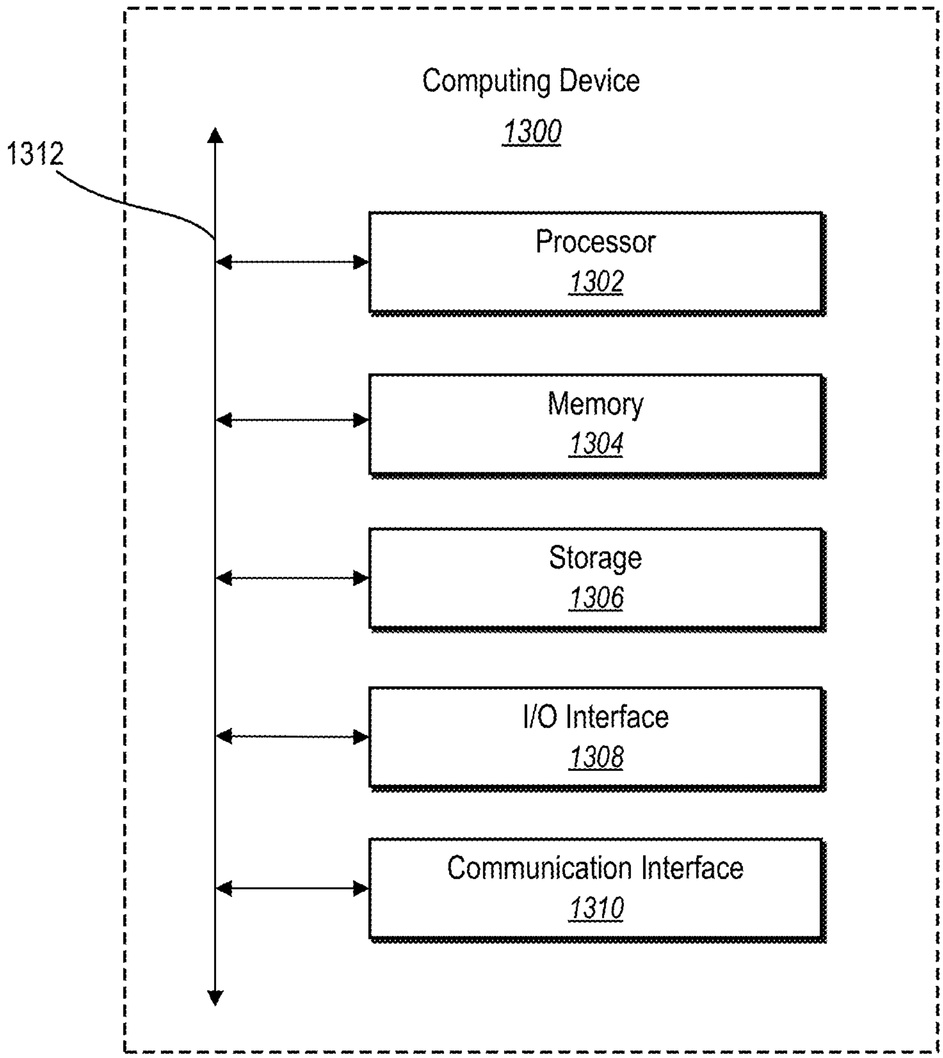
FIG. 13 illustrates a block diagram of an example computing device for implementing one or more embodiments of the present disclosure.

FIG. 13 illustrates a block diagram of an example computing device 1300 that may be configured to perform one or more of the processes described above. One will appreciate that one or more computing devices, such as the computing device 1300, may represent the computing devices described above (e.g., the server device(s) 106, the client device 108). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes the memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes the storage device 1306 for storing data or instructions. As an example, and not by way of limitation, the storage device 1306 can include a non-transitory storage medium described above. The storage device 1306 may include a hard disk drive ("HDD"), flash memory, a Universal Serial Bus ("USB") drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller ("NIC") or network adapter for communicating with an Ethernet or other wire-based network or a wireless NIC ("WNIC") or wireless adapter for communicating with a wireless network, such as a WI-FI. The computing device 1300 can further include the bus 1312. The bus 1312 can include hardware, software, or both that connects components of computing device 1300 to each other.

The components of the high-order objective system 102 can include software, hardware, or both. For example, the components of the high-order objective system 102 can include one or more instructions stored on a computer-readable storage medium and executable by processors of one or more computing devices, such as a client device or server device. When executed by the one or more processors, the computer-executable instructions of the high-order objective system 102 can cause the computing device(s) to perform the methods described herein. Alternatively, the components of the high-order objective system 102 can include hardware, such as a special purpose processing device to perform a certain function or group of functions. Alternatively, the components of the high-order objective system 102 can include a combination of computer-executable instructions and hardware.

Furthermore, the components of the high-order objective system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the high-order objective system 102 may be implemented as a stand-alone application, such as a desktop or mobile application. Furthermore, the components of the high-order objective system 102 may be implemented as one or more web-based applications hosted on a remote server. The components of the high-order objective system 102 may also be implemented in a suite of mobile device applications or "apps."

Figure 14:
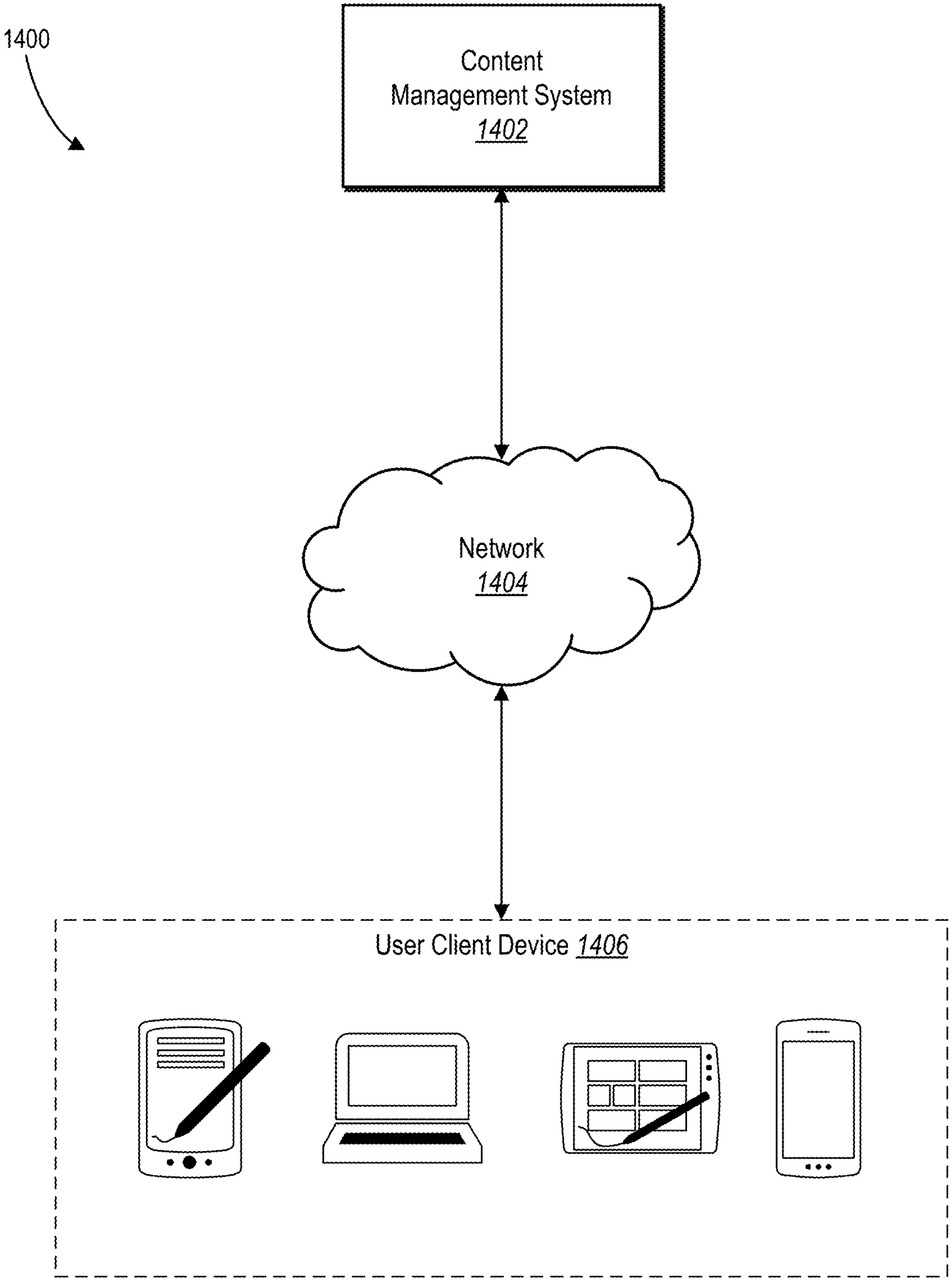
FIG. 14 illustrates a network environment of a content management system in accordance with one or more embodiments.

FIG. 14 is a schematic diagram illustrating a network environment 1400 within which one or more implementations of the high-order objective system 102 can be implemented. For example, the high-order objective system 102 may be part of a content management system 1402 (e.g., the content management system 104). The content management system 1402 may generate, store, manage, receive, and send digital content (such as digital content items). For example, the content management system 1402 may send and receive digital content to and from client device(s) 1406 by way of a network 1404. In particular, the content management system 1402 can store and manage a collection of digital content. The content management system 1402 can manage the sharing of digital content between computing devices associated with a plurality of users. For instance, the content management system 1402 can facilitate a user sharing digital content with another user of the content management system 1402.

In particular, the content management system 1402 can manage synchronizing digital content across multiple client devices 1406 associated with one or more users. For example, a user may edit digital content using client device 1406. The content management system 1402 can cause client device 1406 to send the edited digital content to the content management system 1402. The content management system 1402 then synchronizes the edited digital content on one or more additional computing devices.

In addition to synchronizing digital content across multiple devices, one or more implementations of the content management system 1402 can provide an efficient storage option for users that have large collections of digital content. For example, the content management system 1402 can store a collection of digital content on the content management system 1402, while the client device 1406 only stores reduced-sized versions of the digital content. A user can navigate and browse the reduced-sized versions (e.g., a thumbnail of a digital image) of the digital content on the client device 1406. In particular, one way in which a user can experience digital content is to browse the reduced-sized versions of the digital content on the client device 1406.

Another way in which a user can experience digital content is to select a reduced-size version of digital content to request the full- or high-resolution version of digital content from the content management system 1402. In particular, upon a user selecting a reduced-sized version of digital content, the client device 1406 sends a request to the content management system 1402 requesting the digital content associated with the reduced-sized version of the digital content. The content management system 1402 can respond to the request by sending the digital content to the client device 1406. The client device 1406, upon receiving the digital content, can then present the digital content to the user. In this way, a user can have access to large collections of digital content while minimizing the amount of resources used on the client device 1406.

The client device 1406 may be a desktop computer, a laptop computer, a tablet computer, a personal digital assistant (PDA), an in- or out-of-car navigation system, a smart TV, a virtual reality (VR) or augmented reality (AR) device, a handheld device, a wearable device, a smartphone or other cellular or mobile phone, or a mobile gaming device, other mobile device, or other suitable computing devices. The client device 1406 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.) to access and view content over the network 1404.

The network 1404 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the client device(s) 1406 may access the content management system 1402.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving, from a client device, a high-order objective to be achieved within a computing system;

accessing, from a content management system, one or more stored digital content items associated with a user account of the client device;

extracting, from the one or more stored digital content items and by the computing system, contextual data relevant to the high-order objective;

utilizing one or more artificial intelligence agents to determine, based on the high-order objective and the contextual data extracted from the one or more stored digital content items, a set of sub-processes available to the computing system that combine to accomplish the high-order objective;

determining, by the one or more artificial intelligence agents, one or more executable actions operable within the computing system, the one or more executable actions identifying at least one of an application programming interface, application-specific computer code, or a computing application for execution in furtherance of a first sub-process from among the set of sub-processes;

causing execution of at least one executable action of the one or more executable actions within the computing system by invoking the application programming interface, executing the application-specific computer code, or controlling the computing application to perform the at least one executable action in furtherance of the first sub-process;

generating, by the one or more artificial intelligence agents and based at least in part on the contextual data extracted from the one or more stored digital content items, a logic breakdown comprising a description of the first sub-process and its predicted effect toward the high-order objective; and providing the logic breakdown for display via the client device.

2. The computer-implemented method of claim 1, wherein utilizing the one or more artificial intelligence agents to determine the set of sub-processes comprises utilizing a first artificial intelligence agent to analyze the high-order objective and the contextual data to determine the set of sub-processes, and wherein determining the one or more executable actions comprises utilizing a second artificial intelligence agent to analyze the first sub-process from among the set of sub-processes to determine the one or more executable actions.

3. The computer-implemented method of claim 1, wherein determining the one or more executable actions comprises:

determining a data source corresponding to the first sub-process; and identifying data within the data source to be extracted for executing the at least one executable action.

4. The computer-implemented method of claim 1, further comprising generating, by the one or more artificial intelligence agents, a document or electronic file as a resource for future use by the one or more artificial intelligence agents in executing one or more additional executable actions in furtherance of the high-order objective.

5. The computer-implemented method of claim 1, wherein generating the logic breakdown comprises generating a plurality of logic sections comprising descriptions of the first sub-process.

6. The computer-implemented method of claim 1, wherein generating the logic breakdown comprises utilizing a large language model to generate the description of the first sub-process from a prompt related to the high-order objective.

7. The computer-implemented method of claim 1, further comprising:

receiving, via a control element displayed on the client device, a user interaction indicating an edit to the logic breakdown; and updating the logic breakdown for the first sub-process based on the user interaction indicating the edit.

8. A system comprising: at least one processor; and at least one non-transitory computer-readable storage medium comprising instructions that, when executed by the at least one processor, cause the system to:

receive, from a client device, a high-order objective for achieving a target metric within a computing system;

access, from a content management system, one or more stored digital content items associated with a user account of the client device;

extract, from the one or more stored digital content items and by the computing system, contextual data relevant to the high-order objective;

utilize one or more artificial intelligence agents to determine, based on the high-order objective and the contextual data extracted from the one or more stored digital content items, a set of sub-processes available to the computing system that are combinable to accomplish the high-order objective;

determine, by the one or more artificial intelligence agents, one or more executable actions operable within the computing system, the one or more executable actions identifying at least one of an application programming interface, application-specific computer code, or a computing application for execution in furtherance of a first sub-process from among the set of sub-processes;

cause execution of at least one executable action of the one or more executable actions within the computing system by invoking the application programming interface, executing the application-specific computer code, or controlling the computing application to perform the at least one executable action in furtherance of the first sub-process;

generate, by the one or more artificial intelligence agents and based at least in part on the contextual data extracted from the one or more stored digital content items, a logic breakdown comprising a description of the first sub-process and a predicted effect of the first sub-process toward accomplishing the high-order objective; and provide the logic breakdown for display via the client device.

9. The system of claim 8, wherein providing the logic breakdown for display comprises providing a textual description of the first sub-process for display via the client device.

10. The system of claim 9, wherein the instructions, when executed by the at least one processor, further cause the system to:

receive, from the client device, an instruction to modify the first sub-process; and update parameters of a large language model based on the instruction to modify the first sub-process.

11. The system of claim 8, wherein the instructions, when executed by the at least one processor, further cause the system to:

determine a data source corresponding to the first sub-process; and extract data from the data source to generate an output in furtherance of the high-order objective.

12. The system of claim 8, wherein the instructions, when executed by the at least one processor, further cause the system to:

receive, from the client device, an instruction to activate the first sub-process; and activate the first sub-process within the computing system.

13. The system of claim 8, wherein receiving the high-order objective for achieving the target metric within the computing system comprises obtaining a text input comprising a semantic meaning for achieving the target metric.

14. The system of claim 8, wherein the instructions, when executed by the at least one processor, further cause the system to determine a data source corresponding to the first sub-process and extract data from the data source to generate an output in furtherance of the high-order objective.

15. The system of claim 8, wherein the instructions, when executed by the at least one processor, further cause the system to utilize a large language model to generate a proposed action.

16. A non-transitory computer-readable storage medium comprising instructions that, when executed by at least one processor, cause a computing device to:

receive, from a client device, a high-order objective for achieving one or more target metrics within a computing system;

access, from a content management system, one or more stored digital content items associated with a user account of the client device;

extract, from the one or more stored digital content items and by the computing system, contextual data relevant to the high-order objective;

utilize one or more artificial intelligence agents to determine, based on the high-order objective and the contextual data extracted from the one or more stored digital content items, a set of sub-processes available to the computing system that are combinable to accomplish the high-order objective;

determine, by the one or more artificial intelligence agents, one or more executable actions operable within the computing system, the one or more executable actions identifying at least one of an application programming interface, application-specific computer code, or a computing application for execution in furtherance of a first sub-process from among the set of sub-processes;

cause execution of at least one executable action of the one or more executable actions within the computing system by invoking the application programming interface, executing the application-specific computer code, or controlling the computing application to perform the at least one executable action in furtherance of the first sub-process;

generate, by the one or more artificial intelligence agents and based at least in part on the contextual data extracted from the one or more stored digital content items, a logic breakdown comprising a textual description of the first sub-process and a predicted effect of the first sub-process toward accomplishing the high-order objective; and provide, for display via a user interface of the client device, the logic breakdown comprising the textual description and the predicted effect.

17. The non-transitory computer-readable storage medium of claim 16, wherein generating the logic breakdown comprises generating a plurality of logic sections comprising textual descriptions of the first sub-process.

18. The non-transitory computer-readable storage medium of claim 16, wherein the instructions, when executed by the at least one processor, further cause the computing device to:

provide a control element for display via the client device; and generate an additional logic breakdown for the first sub-process based on a user interaction with the control element.

19. The non-transitory computer-readable storage medium of claim 16, wherein the instructions, when executed by the at least one processor, further cause the computing device to:

receive, from the client device, an instruction to modify the first sub-process;

generate, based on the instruction to modify the first sub-process, a new logic breakdown for the first sub-process; and provide, for display via the user interface, the new logic breakdown.

20. The non-transitory computer-readable storage medium of claim 16, wherein the instructions, when executed by the at least one processor, further cause the computing device to:

determine a data source corresponding to the first sub-process;

extract data from the data source to generate an output in furtherance of the high-order objective; and provide the output for display via the user interface.

* * * * *